(12) United States Patent
Kienzle et al.

(10) Patent No.: US 9,709,430 B2
(45) Date of Patent: Jul. 18, 2017

(54) COAXIAL PROBE COMPRISING TERMINATING RESISTOR

(71) Applicant: VEGA Grieshaber KG, Wolfach (DE)

(72) Inventors: Klaus Kienzle, Zell a. H. (DE); Juergen Dietmeier, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 719 days.

(21) Appl. No.: 14/030,774

(22) Filed: Sep. 18, 2013

(65) Prior Publication Data

US 2014/0084944 A1 Mar. 27, 2014

Related U.S. Application Data

(60) Provisional application No. 61/705,323, filed on Sep. 25, 2012.

(30) Foreign Application Priority Data

Sep. 25, 2012 (EP) .................................... 12185873

(51) Int. Cl.
| | | |
|---|---|---|
| *G01R 27/04* | (2006.01) | |
| *G01F 23/00* | (2006.01) | |
| *G01F 23/284* | (2006.01) | |
| *G01S 7/02* | (2006.01) | |
| *G01S 13/88* | (2006.01) | |

(52) U.S. Cl.
CPC ............ *G01F 23/00* (2013.01); *G01F 23/284* (2013.01); *G01S 7/02* (2013.01); *G01S 13/88* (2013.01)

(58) Field of Classification Search
CPC ........ G01F 23/00; G01F 23/284; G08B 21/00
See application file for complete search history.

(56) References Cited

U.S. PATENT DOCUMENTS

| | | | |
|---|---|---|---|
| 3,424,002 A | 1/1969 | Johnson | |
| 2,874,237 A | 4/1975 | Zwarts | |
| 4,544,880 A | 10/1985 | Nagy et al. | |
| 4,786,857 A * | 11/1988 | Mohr .................... | G01F 23/284 324/643 |
| 5,943,908 A | 8/1999 | Innes et al. | |
| 7,556,529 B2 | 7/2009 | Wakamatsu et al. | |
| 2001/0024116 A1* | 9/2001 | Draving ............. | G01R 1/06766 324/72.5 |
| 2001/0050629 A1* | 12/2001 | Benway ................ | G01F 23/284 342/124 |

(Continued)

FOREIGN PATENT DOCUMENTS

| | | |
|---|---|---|
| CN | 101164205 | 4/2008 |
| CN | 102472772 | 5/2012 |

(Continued)

*Primary Examiner* — Jermele M Hollington
*Assistant Examiner* — Alvaro Fortich
(74) *Attorney, Agent, or Firm* — Fay Kaplun & Marcin, LLP

(57) ABSTRACT

A coaxial probe is for a TDR fill-level measuring instrument, in which probe the inner conductor is connected to the outer conductor via a terminating resistor. The terminating resistor is mounted in a cylindrical recess in the inner conductor and sealed with respect to the measuring environment. In this way, the measurement of the fill level in the region of the probe end can be improved.

15 Claims, 3 Drawing Sheets

(56) References Cited

U.S. PATENT DOCUMENTS

| | | | |
|---|---|---|---|
| 2002/0026828 A1* | 3/2002 | Fehrenbach | G01F 23/284 73/290 V |
| 2002/0121907 A1 | 9/2002 | Griessbaum et al. | |
| 2002/0186025 A1* | 12/2002 | Neven | G01F 23/284 324/642 |
| 2003/0118832 A1* | 6/2003 | Skaling | G01N 33/246 428/412 |
| 2004/0027137 A1* | 2/2004 | Sherrard | G01F 23/284 324/644 |
| 2007/0176708 A1* | 8/2007 | Otsuka | H01P 5/02 333/35 |
| 2008/0264178 A1 | 10/2008 | Gerding | |
| 2008/0303611 A1* | 12/2008 | Michalski | G01F 23/284 333/24 R |
| 2009/0151446 A1* | 6/2009 | Champion | G01F 23/284 73/291 |
| 2010/0126288 A1 | 5/2010 | Osswald | |
| 2011/0199920 A1* | 8/2011 | Takei | G01S 13/767 370/252 |
| 2012/0186339 A1* | 7/2012 | Feisst | G01F 23/284 73/290 V |

FOREIGN PATENT DOCUMENTS

| | | |
|---|---|---|
| DE | 101 01 714 | 5/2002 |
| DE | 10 2004 032 965 | 2/2006 |
| DE | 10 2006 053 399 | 5/2008 |
| DE | 10 2008 041 539 | 3/2010 |
| DE | 15 73 033 | 4/2010 |
| DE | 102008041539 * | 4/2010 |
| EP | 0 780 664 | 6/1997 |
| EP | 1 186 869 | 3/2002 |
| EP | 1 965 181 | 9/2008 |
| EP | 2 154 495 | 2/2010 |
| JP | H0835987 | 2/1996 |
| WO | 2002/042793 | 5/2002 |
| WO | 2006/003082 | 1/2006 |
| WO | 2010/023004 | 3/2010 |
| WO | 2010/049297 | 5/2010 |
| WO | 2011/030494 | 3/2011 |

* cited by examiner

106

106

COAXIAL PROBE COMPRISING TERMINATING RESISTOR

REFERENCE TO RELATED APPLICATIONS

This application claims the benefit of the filing date of EP Patent Application Ser. No. 12 185 873.2 filed on 25 Sep. 2012 and U.S. Provisional Patent Application Ser. No. 61/705,323 filed on 25 Sep. 2012, the disclosure of both applications is hereby incorporated by reference.

FIELD OF THE INVENTION

The present invention relates to fill-level measuring. In particular, the present invention relates to a coaxial probe for a time-domain reflectometry fill-level measuring instrument and to a time-domain reflectometry fill-level measuring instrument comprising such a coaxial probe.

TECHNICAL BACKGROUND

Time-domain reflectometry or TDR is a method for determining and analysing run lengths and reflection characteristics of electromagnetic waves and signals.

In a TDR-based fill-level measuring instrument, a low-energy electromagnetic pulse is generated by the electronics of the sensor, coupled into a conductor (also referred to as a probe) and guided along this probe. The probe is generally a coaxial waveguide, a metal rod or a steel cable.

If this microwave pulse then hits the surface of the medium to be measured, part of the pulse is reflected at said surface and returns along the probe to the electronics, which then calculates the fill level from the time difference between the transmitted pulse and the received pulse (in the nanosecond range).

The sensor can output the calculated fill level as a continuous analogue signal or a switch signal. An advantage of this method is that the measurement result is scarcely influenced by the properties of the medium to be measured, for example density, conductivity and dielectric constant, or by the environmental conditions, for example pressure and temperature, and that no interference-prone moving parts are required.

The probe of the TDR sensor ensures that the signal reaches the filling material undisturbed. Liquids, bulk materials and interfaces in liquids are measured using this measuring method.

Not least for geometric reasons, however, the measuring accuracy of the fill-level measuring instrument can be impaired in the region of the probe end which is turned towards the filling material.

SUMMARY OF THE INVENTION

According to a first aspect of the invention, a coaxial probe for a time-domain reflectometry fill-level measuring instrument is specified. The probe comprises an inner conductor and an outer conductor. In addition, a terminating resistor is provided and is integrated into the inner conductor and electrically interconnects the inner and outer conductors.

The terminating resistor has for example an electrical resistance of 50 Ohm and allows the fill level up to the probe end to be measured with relatively high accuracy, or even measured at all.

The terminating resistor is mounted in the inner conductor of the coaxial probe and can be sealed completely with respect to the measuring environment.

For this purpose, according to one embodiment of the invention the coaxial probe comprises a sealing device which is intended to prevent exchange of fluid between the measuring environment of the probe and the terminating resistor.

The sealing device comprises for example a main body in which the terminating resistor is embedded and which is located in a recess in an end of the inner conductor to be turned towards the filling material to be measured.

Here and in the following, the "end" of the inner conductor and the "end" of the coaxial probe is understood to mean the "lower" end of the inner conductor or of the outer conductor or of the coaxial probe. This lower end is the end which points towards the filling material or is located below the filling material surface when the fill-level measuring instrument is mounted in the container. As a rule the probe points downwards, and therefore this end is the "lower" end of the probe.

According to a further embodiment of the invention, the sealing device comprises a sealing ring which is embedded in the main body at least in part and which is used for sealing between the main body and the inner conductor. For this purpose, the main body of the sealing device comprises for example a peripheral groove into which the sealing ring (for example in the form of an O-ring) can be pressed.

The sealing device and in particular the main body can also consist of or comprise a mouldable plastics material. In particular, after it has been fitted in the inner conductor, the terminating resistor can be encapsulated with the mouldable plastics material. In this case, it is not necessary to provide an additional sealing ring.

The mouldable plastics material is for example a perfluoroalkoxy polymer (PFA).

According to a further embodiment of the invention, the coaxial probe comprises a spring element which is arranged between the terminating resistor and the inner conductor and connects the terminating resistor to the inner conductor.

The contacting can also take place in another manner. For example, the connecting wire of a wire-wound resistor can be clamped or pressed in a further shallow hole. The contacting can also take place merely by means of a resin or a conductive liquid without a spring element, or a conductive adhesive.

The spring element has for example been rigidly fitted on the terminating resistor prior to installation of the resistor and is then inserted into the inner conductor together with the resistor until the spring element abuts against the inner conductor and is somewhat compressed. The terminating resistor is then fixed in the inner conductor such that it can no longer move and the spring element remains under stress.

The end of the spring element remote from the terminating resistor can be pressed against the inner conductor by the spring force. This spring force may be sufficient to establish the electrical contact between spring element and inner conductor. For example, it is possible for a conductive liquid or a conductive resin to be poured between the terminating resistor and the face of the inner conductor which forms the base of the recess in the inner conductor into which the terminating resistor is integrated, such that the electrical contact between the spring element and the inner conductor can be ensured in a simple and reliable manner After insertion of the terminating resistor the resin can cure, whereby the electrical contact can be protected.

According to a further embodiment of the invention, the inner conductor comprises a cylindrical recess for receiving the terminating resistor.

The surface of the cylindrical recess (the cylinder shell) can comprises a groove in which the sealing ring engages when the sealing device is inserted into the recess. This groove can also prevent the sealing device from accidentally slipping out of the recess.

According to a further embodiment of the invention, the sealing device is injected into the inner conductor such that the terminating resistor is thus integrally cast in the inner conductor after its installation.

An additional sealing ring is not necessary in this case.

According to a further embodiment of the invention, a cover is provided at the lower end of the probe and electrically interconnects the terminating resistor and the outer conductor.

For the purpose of clarification, it is noted at this point that the terminating resistor may be an electrical component which is commonly referred to as a resistor. This terminating resistor forms, together with the spring element and the cover, the electrical connection between the inner conductor and the outer conductor.

The spring element, terminating resistor, cover and sealing device can be assembled before the sealing device is inserted into the cylindrical recess of the inner conductor. The cover can then be bonded to the outer conductor or welded thereto or conductively connected thereto in another manner.

According to a further embodiment of the invention, the cover is star-shaped. It is also possible for the cover to be in the form of a perforated plate or a metal plate provided with holes.

According to a further embodiment of the invention, the inner conductor comprises a main body and a front end piece which is placed on the main body of the inner conductor and thus extends the inner conductor, the terminating resistor being integrated into the front end piece of the inner conductor.

In this embodiment an attachment part is thus provided which for example comprises an outer edge which can be slid over the outer conductor. Existing coaxial probes can be retrofitted in this manner.

According to a further embodiment of the invention, the coaxial probe comprises a single terminating resistor which is arranged on the longitudinal axis of the inner conductor. Further resistor elements are not provided.

According to a further embodiment of the invention, the coaxial probe comprises a switching device, by means of which the terminating resistor can be connected between the inner conductor and the outer conductor and by means of which the electrically conductive connection between inner conductor and outer conductor can be interrupted via the terminating resistor.

A controllable resistor can also be provided, such that the value of the ohmic resistance of the conductive connection between inner conductor and outer conductor can be adjusted, for example between the ranges 40 Ohm and 60 Ohm or between the ranges 30 Ohm and 70 Ohm.

According to a further embodiment of the invention, the main body of the sealing device is composed of an elastomer, for example fluororubber (FKM) or a mouldable thermoplastic elastomer (TPE).

The main body can thus have special sealing regions, such that a further sealing element, for example O-rings, can be omitted. The inner pin for contacting the cover could also be sealed at the same time.

According to a further aspect of the invention, a time-domain reflectometry fill-level measuring instrument comprising a coaxial probe described above and below is provided.

In the following, embodiments of the invention are described with reference to the drawings.

DETAILED DESCRIPTION OF EMBODIMENTS

Figure 1:
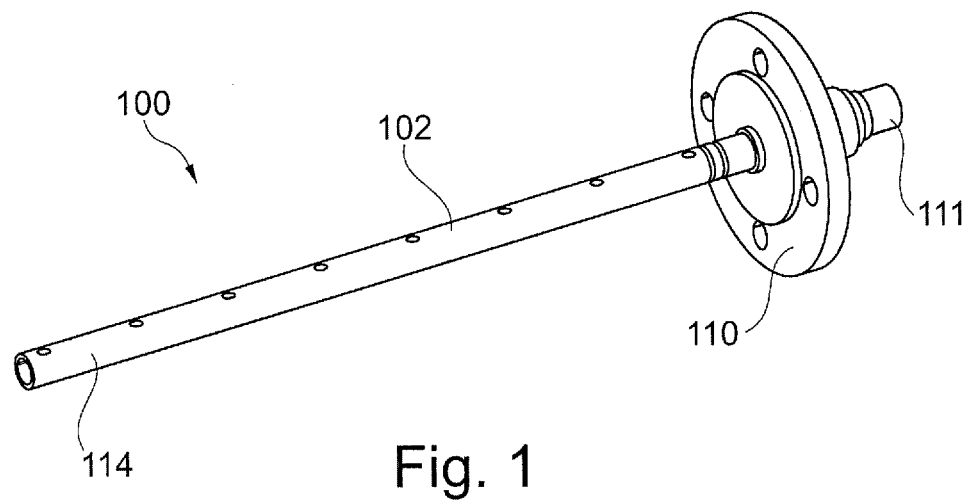
FIG. 1 is a perspective view of a coaxial probe according to one embodiment of the invention.

The views in the drawings are schematic and not to scale.

In the following description of the drawings, when like reference numerals are used in different drawings, they denote like or similar elements. However, like or similar elements may also be denoted by different reference numerals.

FIG. 1 is a perspective view of a coaxial probe for a TDR fill-level measuring instrument. The coaxial probe 100 comprises a flange 110 at the upper end 111 of the outer conductor 102, in order to fasten the probe to the filling material container. At the upper end 111 of the probe there is an interface for connection to the electronics of the fill-level measuring instrument.

Figure 2:
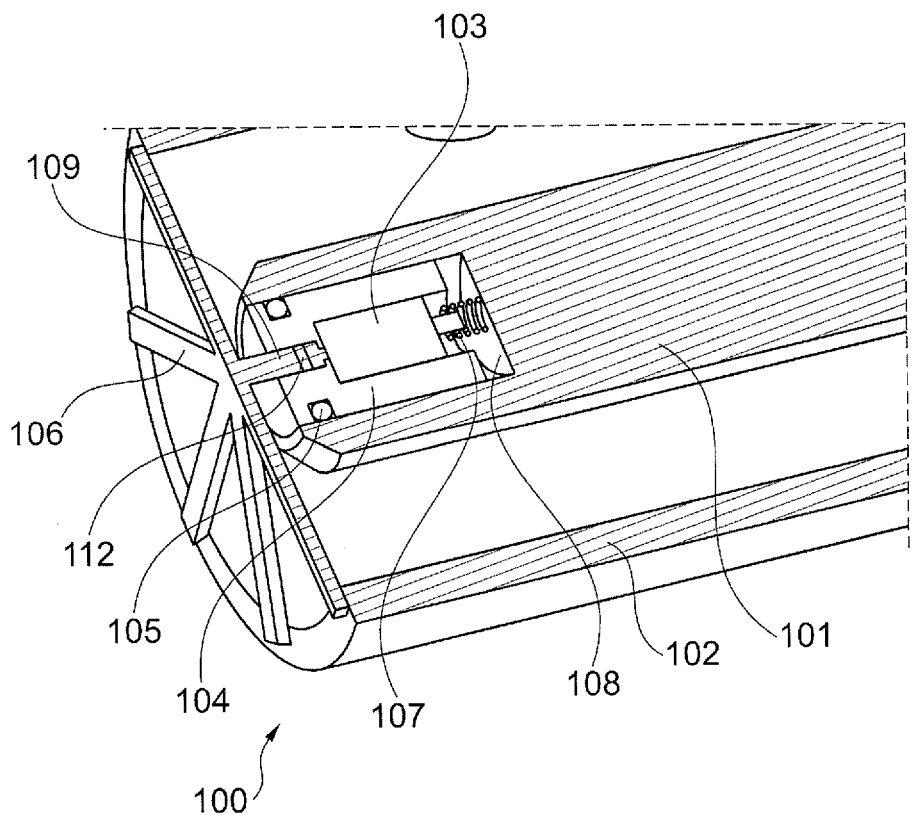
FIG. 2 is a perspective sectional view of a coaxial probe according to one embodiment of the invention.

FIG. 2 is a perspective sectional view through the lower end 114 (cf. FIG. 1) of the probe 100. FIG. 2 shows the probe comprises an inner conductor 101 and a coaxially arranged outer conductor 102.

At the lower end of the inner conductor there is a recess which for example is cylindrical and is also arranged coaxially. A terminating resistor 103 which is embedded in a sealing material 104 is inserted into this recess. This material is for example PFA or another insulating plastics material.

At its upper end the terminating resistor 103 is conductively connected via the spring element 107 to the base 108 of the recess in the inner conductor.

Between the base 108 of the recess, the resistor 103 and the seal 104 there is a cavity which for example can be filled with a resin which cures after installation of the resistor element 103 in the inner conductor 101.

At the upper end of the terminating resistor 103 there is a feed line 109 which connects the terminating resistor 103 to the star-shaped cover 106. A switching element 112 which can selectively interrupt or close the connection between the resistor 103 and the cover device 106 can be integrated into this feed line 109. This switching element can also be designed to control the terminating resistor 103, that is to say to change its resistance value. For example, the switching element is connected to a control device (not shown).

The terminating resistor 103 is completely sealed with respect to the environment of the coaxial probe such that it cannot come into contact with the filling medium or the measuring environment of the probe. In addition, an O-ring 105 which further improves the sealing between the main body 104 and the inner conductor 101 can be provided.

By means of the terminating resistor it is possible to avoid, for example, ringing at the probe end, which can occur during the measurement. Good measuring results for fill levels in the region of the probe end can thus be obtained.

Owing to the star-shaped cover 106, which for example comprises six or eight arms arranged in a star shape, a symmetrical distribution of the electromagnetic field can be achieved. The star-shaped cover is conductively connected to both the terminating resistor 103 and the outer conductor 102. This connection can take place for example via bonding or welding. Clamping is also possible.

Figure 3:
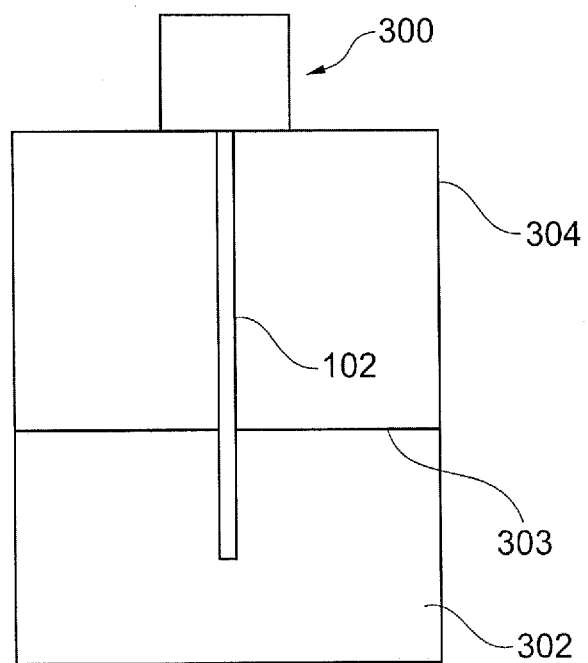
FIG. 3 shows a fill-level measuring instrument in a container according to one embodiment of the invention.

FIG. 3 shows a container 304 on which a TDR fill-level measuring instrument 300 is fitted. The coaxial probe of the measuring instrument dips into the filling material 302 such that the lower end of the coaxial probe is located below the filling material surface 303.

Figure 4:
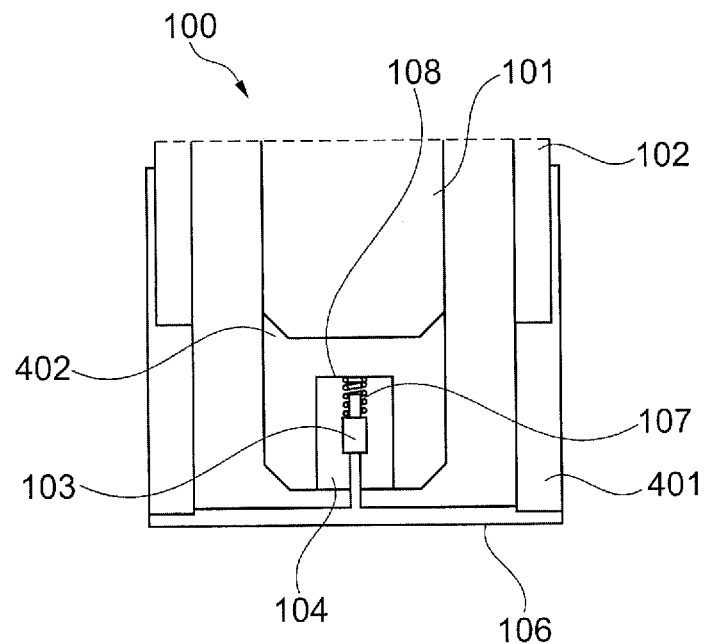
FIG. 4 is a sectional view of a coaxial probe according to a further embodiment of the invention.

FIG. 4 is a sectional view of the lower end of a coaxial probe 100 according to a further embodiment of the invention. In this embodiment, the lower end of the coaxial probe 100 is divided into two parts. The second, lower part can be placed on the upper part. It is thus a type of modular probe extension which comprises the terminating resistor 103.

The terminating resistor 103 is integrated not into the main inner conductor 101 but rather in the connecting piece 402 which is connected to the main inner conductor 101, by placing the extension on the end of the original coaxial probe.

For example, the outer conductor 401 of the attachment piece is designed such that it has two different inner diameters. In the lower region, the inner diameter of the attachment piece matches the inner diameter of the original outer conductor 102. In the upper region, however, the inner diameter of the attachment piece matches the outer diameter of the original inner conductor 102, such that the attachment piece can be slid or screwed over the outer conductor 102 in this region.

In the slid-on (or screwed-on) position, it can then in the simplest case be fastened via a pipe clip. If it is screwed on by a rotational movement, the outer surface of the outer conductor 102 comprises an external thread and the inner surface of the upper region of the attachment piece comprises a corresponding internal thread. Alternatively, bonding or welding of probe and attachment piece is also possible.

The terminating resistor 103 is embedded in the inner conductor attachment piece 402 in the same manner as described above.

The embodiment in FIG. 4 shows that it is not necessary for a cavity to be provided between the terminating resistor 103 and the base 108 of the recess. Such a cavity can be omitted for example when the resistor is integrally cast in the recess after installation.

The connection between the outer conductor 102 and the outer conductor attachment piece 401 can be airtight. In particular, the attachment shown in FIG. 4 can be retrofitted on an existing coaxial probe.

In summary, it is found that a single central resistor 103 in the centre of the coaxial probe (in the transverse direction) and at the lower end of the probe (in the longitudinal direction) can assume the role of a plurality of resistors connected in parallel at the probe end. The symmetrical distribution of the electromagnetic field can be ensured by means of a star or a corresponding conductive electrical connection to the outer conductor.

By mounting such a "resistor unit" in the inner conductor of the TDR probe, it is possible to seal said unit from the medium to be measured.

Figure 5:
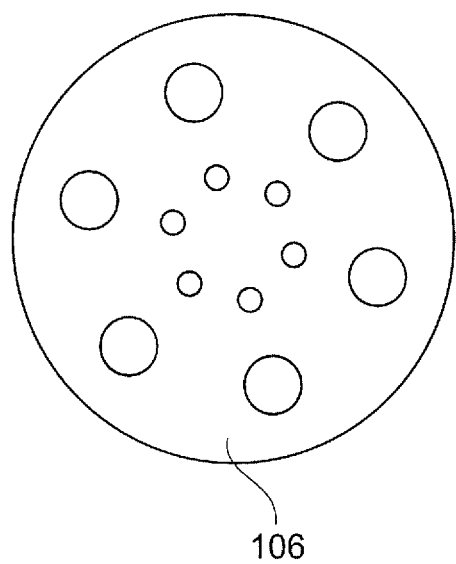
FIG. 5 shows a cover according to one embodiment of the invention.

FIG. 5 shows an alternative to the star-shaped cover 106 in FIG. 2. In the embodiment in FIG. 5, the cover is in the form of a metal plate which comprises a plurality of holes through which the filling fluid can pass. For example, two groups of holes are provided, the first group having a smaller diameter than the second group and each of the two groups being arranged on one of two concentrically arranged circular rings.

Figure 6:
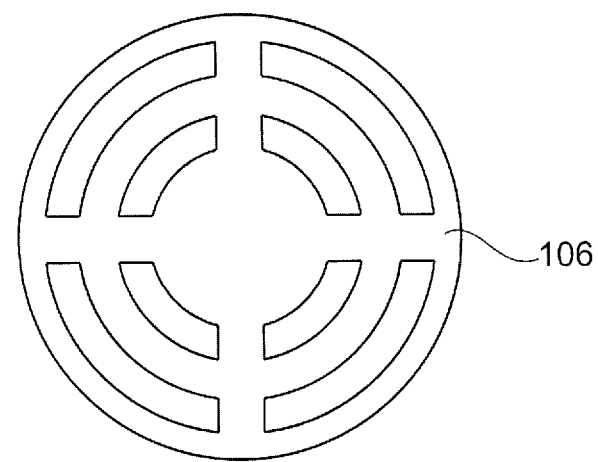
FIG. 6 shows a cover according to a further embodiment of the invention.

FIG. 6 shows a further embodiment of a cover 106, which comprises a plurality of slot-shaped recesses located on two concentric circular rings.

For completeness, it should be noted that "comprising" and "having" do not exclude the possibility of other elements or steps, and "an" or "a" does not exclude the possibility of a plurality. It should further be noted that features or steps which have been described with reference to one of the above embodiments may also be used in combination with other features or steps of other above-described embodiments. Reference numerals in the claims should not be considered limiting.

The invention claimed is:

1. A coaxial probe for a time-domain reflectometry fill-level measuring instrument, comprising:
    an inner conductor;
    an outer conductor; and
    a terminating resistor integrated into the inner conductor and via which the inner conductor is electrically connected to the outer conductor;
    wherein the inner conductor includes a main body and a front end piece which is placed on the main body of the inner conductor and thus extends the inner conductor;
    wherein the terminating resistor is integrated into the front end piece of the inner conductor; and
    wherein the terminating resistor is mounted inside of the inner conductor.

2. The coaxial probe according to claim 1, further comprising:
    a sealing device preventing exchange of fluid between an environment of the probe and the terminating resistor.

3. The coaxial probe according to claim 1, further comprising:
    a spring element arranged between the terminating resistor and the inner conductor and electrically connects the terminating resistor to the inner conductor.

4. The coaxial probe according to claim 2, wherein the sealing device includes a main body in which the terminating resistor is embedded and which is located in a recess in an end of the inner conductor which is to be turned towards the filling material to be measured.

5. The coaxial probe according to claim 4, wherein the sealing device includes a sealing ring which is embedded in the main body at least in part and which is used for sealing between the main body and the inner conductor.

6. The coaxial probe according to claim 2, wherein the main body of the sealing device is composed of mouldable plastics material.

7. The coaxial probe according to claim 1, wherein the inner conductor includes a cylindrical recess for receiving the terminating resistor.

8. The coaxial probe according to claim 7, wherein the surface of the cylindrical recess comprises a groove in which the sealing ring engages when the sealing device is inserted into the recess.

9. The coaxial probe according to claim 1, wherein the sealing device is injected into the inner conductor.

10. The coaxial probe according to claim 1, further comprising:
a cover at an end of the probe to be turned towards the filling material to be measured, which cover electrically interconnects the terminating resistor and the outer conductor.

11. The coaxial probe according to claim 10, wherein the cover is star-shaped.

12. The coaxial probe according to claim 1, wherein a single terminating resistor is provided and is arranged on the longitudinal axis of the inner conductor.

13. The coaxial probe according to claim 1, further comprising:
a switching device selectively switching on the terminating resistor between inner conductor and outer conductor.

14. The coaxial probe according to either claim 4, wherein the main body of the sealing device is composed of an elastomer.

15. A time-domain reflectometry fill-level measuring instrument, comprising:
a coaxial probe including: an inner conductor; an outer conductor; and a terminating resistor which is integrated into the inner conductor and via which the inner conductor is electrically connected to the outer conductor;
wherein the inner conductor includes a main body and a front end piece which is placed on the main body of the inner conductor and thus extends the inner conductor;
wherein the terminating resistor is integrated into the front end piece of the inner conductor; and
wherein the terminating resistor is mounted inside of the inner conductor.

* * * * *